United States Patent
McCrary

(10) Patent No.: US 11,132,204 B2
(45) Date of Patent: Sep. 28, 2021

(54) AGGREGATED DOORBELLS FOR UNMAPPED QUEUES IN A GRAPHICS PROCESSING UNIT

(71) Applicant: ADVANCED MICRO DEVICES, INC., Santa Clara, CA (US)

(72) Inventor: Rex Eldon McCrary, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/721,421

(22) Filed: Dec. 19, 2019

(65) Prior Publication Data

US 2021/0191730 A1   Jun. 24, 2021

(51) Int. Cl.
*G06F 3/06*       (2006.01)
*G06F 9/48*       (2006.01)
*G06F 9/38*       (2018.01)

(52) U.S. Cl.
CPC .......... *G06F 9/3867* (2013.01); *G06F 3/0659* (2013.01); *G06F 9/4812* (2013.01)

(58) Field of Classification Search
None
See application file for complete search history.

(56) References Cited

U.S. PATENT DOCUMENTS

| | | | |
|---|---|---|---|
| 6,324,594 B1 * | 11/2001 | Ellis ........................ | G06F 13/28 710/24 |
| 2013/0227562 A1 * | 8/2013 | Tsirkin .................. | G06F 9/5088 718/1 |
| 2015/0067291 A1 * | 3/2015 | Miyamoto .............. | G06F 13/00 711/167 |
| 2018/0114290 A1 * | 4/2018 | Paltashev .............. | G06T 15/005 |

* cited by examiner

*Primary Examiner* — Joni Hsu

(57) ABSTRACT

A processing system includes a set of queues to store command buffers prior to execution in a corresponding plurality of pipelines. The processing system also includes one or more first doorbells and a second doorbell. The first doorbells map to one or more queues in the set of queues on a one-to-one basis. The second doorbell maps to a subset of the set of queues on a one-to-many basis. A doorbell monitor generates an interrupt in response to an empty queue in the subset becoming a non-empty queue. A scheduler polls the subset in response to the interrupt. The scheduler schedules a command buffer from the non-empty queue for execution or adds the command buffer to a pool for subsequent execution.

20 Claims, 6 Drawing Sheets

AGGREGATED DOORBELLS FOR UNMAPPED QUEUES IN A GRAPHICS PROCESSING UNIT

BACKGROUND

Conventional processing systems include a central processing unit (CPU) and a graphics processing unit (GPU) that implements audio, video, and multimedia applications. In some cases, the CPU and GPU are integrated into an accelerated processing unit (APU). Processing on the GPU is typically initiated by application programming interface (API) calls (e.g., draw calls) that are processed by the CPU. For example, a draw call to perform graphics processing generates a call to a user mode driver (UMD), which generates the appropriate commands and writes them into a command buffer. The commands in the command buffer are written to a queue (or ring buffer) and then an associated doorbell is written to indicate that the command buffer is available in the queue for execution on the GPU. A scheduler monitors the doorbells associated with a set of queues that are mapped to the scheduler. In response to a doorbell of a mapped queue being written, the scheduler schedules the command buffer at the head of the mapped queue for execution on the GPU. However, only a subset of the queues is mapped to the scheduler at any one time and the scheduler does not monitor the doorbells associated with unmapped queues. Consequently, the scheduler remains unaware of the presence of command buffers arriving at previously empty queues if the queues are not mapped to the scheduler.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-5 disclose embodiments of techniques that balance competing requirements for low polling overhead of doorbells for empty unmapped queues and low scheduling latencies for command buffers provided to the unmapped queues. Multiple unmapped queues are associated with an aggregated doorbell that is monitored by a hardware doorbell monitor. The doorbell monitor generates an interrupt to notify the scheduler in response to one of the multiple unmapped, empty queues becoming non-empty, e.g., receiving a command buffer. In response to receiving the interrupt, the scheduler polls the multiple unmapped queues associated with the aggregated doorbell to determine which of the unmapped queues received a command buffer and became a non-empty queue. The scheduler subsequently schedules the command buffer in the non-empty queue for execution on the processing system or adds the command buffer to a pool of command buffers that are available for subsequent scheduling.

Mapped queues are added to a list of unmapped queues that are associated with the aggregated doorbell in response to the mapped queue becoming empty. In some embodiments, the scheduler disables fetching by a doorbell associated with the newly empty, mapped queue and initiates de-queuing (or unmapping) of the queue, e.g., by modifying an index to add the queue to the list of unmapped queues and thereby associate the queue with the aggregate doorbell. In response to modifying the index, the scheduler checks the value of a write pointer for the queue to verify whether the queue is still empty or the queue has been written subsequent to disabling fetching by the doorbell. If the value of the write pointer for the queue is equal to a value of a read pointer for the queue, the scheduler associates the newly unmapped queue with the aggregated doorbell. Some embodiments of the list associate each unmapped queue with one of a plurality of aggregated doorbells that have different priorities or are associated with different properties or characteristics of the unmapped queue. If the value of the write pointer for the queue is not equal to the value of the read pointer for the queue, which indicates that the queue has been written, the queue is mapped to a doorbell and the index is modified to add the queue to a list of active queues that are available for mapping to hardware immediately or in the future. Processes are mapped to the queues (i.e., they "own" the queues) for a time quantum. In some embodiments, the unmapping procedure disclosed herein is performed in response to expiration of the time quantum.

Figure 1:
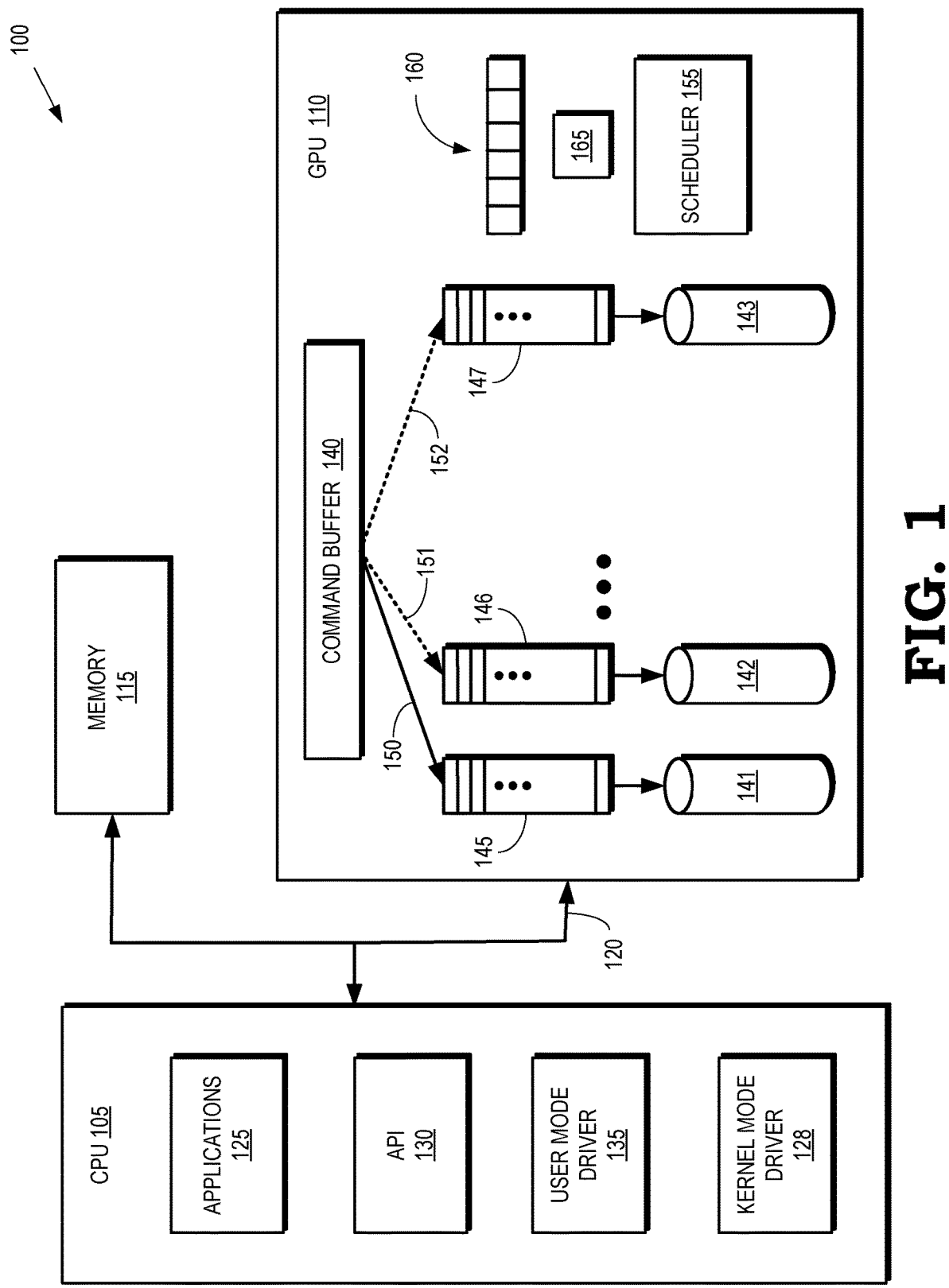
FIG. 1 is a block diagram illustrating a processing system that implements aggregated doorbells for unmapped queues according to some embodiments.

FIG. 1 is a block diagram illustrating a processing system 100 that implements aggregated doorbells for unmapped queues according to some embodiments. The processing system 100 includes a central processing unit (CPU) 105 for executing instructions such as draw calls and a graphics processing unit (GPU) 110 for performing graphics processing and, in some embodiments, general purpose computing. The processing system 100 also includes a memory 115 such as a system memory, which is implemented as dynamic random access memory (DRAM), static random access memory (SRAM), nonvolatile RAM, or other type of memory. The CPU 105, the GPU 110, and the memory 115 communicate over an interface 120 that is implemented using a bus such as a peripheral component interconnect (PCI, PCI-E) bus. However, other embodiments of the interface 120 are implemented using one or more of a bridge, a switch, a router, a trace, a wire, or a combination thereof.

As illustrated, the CPU 105 executes a number of processes, such as one or more applications 125 that generate graphics commands, a user mode driver 135 or other drivers, such as a kernel mode driver 128. The applications 125 include applications that utilize the functionality of the GPU 110, such as applications that generate work in the processing system 100 or an operating system (OS). Some embodiments of the application 125 include one or more graphics instructions that instruct the GPU 110 to render a graphical user interface (GUI), a graphics scene, or other image or combination of images for presentation to a user. For example, the graphics instructions can include instructions that define a set of one or more graphics primitives to be rendered by the GPU 110.

Some embodiments of the application 125 utilize a graphics application programming interface (API) 130 to invoke a user mode driver 135 or other GPU driver. User mode driver 135 issues one or more commands to the GPU 110. The commands instruct the GPU 110 to render one or more graphics primitives into displayable graphics images. Based on the graphics instructions issued by application 125 to the user mode driver 135, the user mode driver 135 formulates one or more graphics commands that specify one or more operations for GPU 105 to perform for rendering graphics. In some embodiments, the user mode driver 135 is a part of the application 125 running on the CPU 105. For example, a gaming application running on the CPU 105 can implement the user mode driver 135. Similarly, some embodiments of an operating system running on the CPU 105 implement a kernel mode driver (not shown).

The GPU 110 receives command buffers 140 (only one is shown in FIG. 1 in the interest of clarity) from the CPU 105 via the interface 120. The command buffer 140 includes sets of one or more commands for execution by one of a plurality of concurrent graphics pipelines 141, 142, 143, which are collectively referred to herein as "the pipelines 141-143." Queues 145, 146, 147 (collectively referred to herein as "the queues 145-147") are associated with the pipelines 141-143 and hold command buffers for the corresponding queues 145-147. In the illustrated embodiment, the command buffer 140 is stored in an entry of the queue 145 (as indicated by the solid arrow 150), although other command buffers received by the GPU 110 are distributed to the other queues 146, 147 (as indicated by the dashed arrows 151, 152). The command buffers are distributed to the queues 145-147 using a round-robin algorithm, randomly, or according to other distribution algorithms.

A scheduler 155 schedules command buffers from the head entries of the queues 145-147 for execution on the corresponding pipelines 141-143. The GPU 110 includes a set 160 of doorbells that indicate whether the queues 145-147 are empty or non-empty, i.e., have at least one command buffer in an entry of the non-empty queue. Some embodiments of the set 160 of doorbells are implemented as memory-mapped interrupts. A driver such as the kernel mode driver 128 or the user mode driver 135 writes the doorbell using a simple pointer and does not need a library call to write the doorbell. If a queue is mapped to a doorbell in the set 160, writing to the doorbell indicates that the corresponding queue 145-147 is non-empty and includes a command buffer that is ready to be scheduled.

The set 160 includes one or more doorbells that map to corresponding queues 145-147 on a one-to-one basis. The set 160 also includes one or more aggregated doorbells that each map to a subset of the queues 145-147 on a one-to-many basis. The aggregated doorbells are assigned to empty queues that are not include any command buffers. A doorbell monitor 165 monitors the aggregated doorbells and generates an interrupt in response to an empty queue associated with the aggregated doorbells becoming a non-empty queue. In response to an interrupt from the doorbell monitor 165, the scheduler 155 polls the queues associated with the aggregated doorbell to identify the newly non-empty queue. The scheduler 155 then schedules a command buffer from the non-empty queue for execution in a corresponding pipeline 141-143. Mapping the empty queues to aggregated doorbells allows command buffers that are added to empty queues to be scheduled efficiently. The interrupts are expected to be relatively infrequent and so the polling overhead does not significantly impact overall performance.

In some embodiments, the scheduler 155 suspends one or more of the queues 145-147. For example, if the scheduler 155 determines one of the queues 145-147 is empty and the scheduler 155 wants to be informed when work is available in the suspended one of the queues 145-147, the scheduler 155 transmits a request to the kernel mode driver 128 to request that the queue be suspended and then the scheduler 155 proceeds with normal operation. The host CPU 150 switches the doorbell for the suspended queue in the set 160 to an aggregated mode for the privileged mode and then the host CPU 150 transmits a response to the request to suspend one of the queues 145-147, which can be an interrupt or packet that indicates that the doorbell has been set to aggregated mode. In response to receiving the packet or interrupt, the scheduler 155 compares the read and write pointers for the suspended queue to determine whether the suspended queue is still empty. If the read and write pointers are equal, which indicates that the suspended queue is empty, the scheduler 155 proceeds with normal operation. If the read and write pointers are different, which indicates that a command buffer has been written to the suspended queue, the suspended queue is switched back to the active mode and associated with a doorbell.

In some embodiments, two address bands are available for monitoring the doorbells in the set 160: default bands and alternate aperture bands. The aggregated doorbells can monitor the alternate apertures instead of the default bands. When the scheduler 155 determines that one of the queues in the empty list has received work such as a command buffer, the scheduler 155 transmits a request to the kernel mode driver 128 to temporarily suspend the queue while a doorbell pointer address for the doorbell associated with the suspended queue is changed from the alternate aperture back to the default band. The scheduler 155 does not need to wait for an acknowledgment of the request and instead the scheduler 155 continues through the standard sequence.

Figure 2:
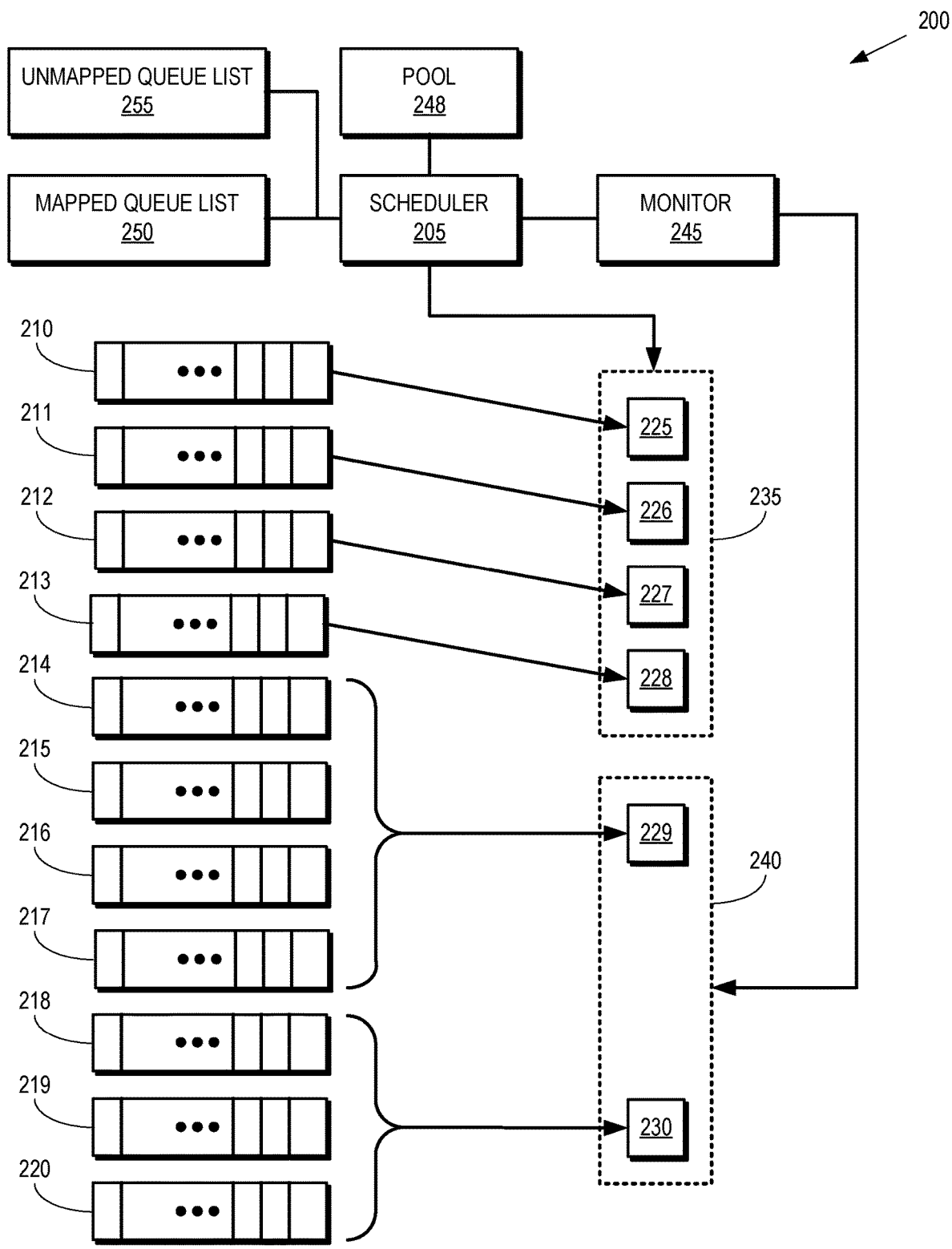
FIG. 2 is a block diagram of a scheduling system for a processing unit such as a GPU according to some embodiments.

FIG. 2 is a block diagram of a scheduling system 200 for a processing unit such as a GPU according to some embodiments. The scheduling system 200 is implemented in some embodiments of the GPU 110 shown in FIG. 1. The scheduling system 200 includes a scheduler 205 for scheduling command buffers from a set of queues 210, 211, 212, 213, 214, 215, 216, 217, 218, 219, 220, which are collectively referred to herein as "the queues 210-220." The scheduling system 200 also includes doorbells 225, 226, 227, 228, 229, 230 (collectively referred to herein as "the doorbells 225-230") that are partitioned into a first subset 235 and a second subset 240. The doorbells 225-228 in the first subset 235 are individually mapped to a single one of the queues 210-220, i.e., on a one-to-one basis. The second subset 240 of aggregated doorbells 229, 230 are each mapped to multiple queues 210-220, i.e., on a one-to-many basis. The doorbells 225-230 are implemented as memory-mapped interrupts.

The number of queues 210-220 in the scheduling system 200 is larger than the number of doorbells 225-230 and only a portion of the queues 210-220 are directly mapped on a one-to-one basis to a corresponding one of the doorbells 225-230. In the illustrated embodiment, the queue 210 is mapped to the doorbell 225, the queue 211 is mapped to the doorbell 226, the queue 212 is mapped to the doorbell 227, and the queue 213 is mapped to the doorbell 228. Sets or groups of empty queues are mapped to the aggregated doorbells 229, 230 on a one-to-many basis. In the illustrated embodiment, the empty queues 214-217 are mapped to the aggregated doorbell 229 and the empty queues 218-220 are mapped to the aggregated doorbell 230. In some embodiments, the number of empty queues that are mapped to a single aggregated doorbell is larger or smaller than shown in FIG. 2.

The scheduler 205 monitors the doorbells 225-228 in the first subset 235. In response to one of the doorbells 225-228 being written, the scheduler 205 schedules a command buffer from a head of the queue mapped to the written doorbell 225-228. For example, if the scheduler 205 detects that the doorbell 225 has been written, the scheduler 205 schedules a command buffer from the mapped queue 210. In some cases, instead of scheduling the command buffer, the scheduler 205 adds the command buffer to a pool 248 of command buffers that are available for subsequent scheduling. The scheduler 205 does not directly monitor the aggregated doorbells 229, 230 in the second subset 240. Instead, a hardware doorbell monitor 245 monitors the second subset 240 and generates an interrupt in response to either of the aggregated doorbells 229, 230 being written. The scheduler 205 polls the queues 214-220 associated with the aggregated doorbells 229, 230 in response to the interrupt to determine which of the queues 214-220 received a command buffer and is no longer empty. For example, if the hardware doorbell monitor 245 determines that the aggregated doorbell 229 has been written, the scheduler 205 polls the queues 214-217 to determine which of the queues 214-217 is non-empty. The scheduler 205 then schedules a command buffer from the newly non-empty queue for execution or adds the command buffer to the pool 248 of command buffers that are available for scheduling.

Some embodiments of the scheduling system 200 include a mapped queue list 250 that indicates the queues 210-213 that are mapped to the doorbells 225-228. The scheduling system 200 also includes an unmapped queue list 255 that indicates the queues 214-220 that are not mapped (e.g., on a one-to-one basis) to individual doorbells and are instead collectively associated with one of the aggregate doorbells 229, 230. In some embodiments, queues are added to or removed from the mapped queue list 250 and the unmapped queue list 255 by modifying an associated index that indicates either the mapped queue list 250 or the unmapped queue list 255. The scheduler 205 uses the mapped queue list 250 to determine which doorbells to monitor. Some embodiments of the scheduler 205 move queues from the mapped queue list 250 to the unmapped queue list 255 in response to the queues becoming empty, e.g., by modifying a value of an associated index. Moving the queues includes disabling fetching by the doorbells that are mapped to the queues prior to the queues becoming empty and changing the index to indicate the unmapped queue list 255. In response to receiving an acknowledgment response (e.g., a packet or an interrupt) indicating that the host CPU has changed the doorbell, the scheduler 205 verifies that the queue is still empty by comparing the read and write pointers for the queue prior to moving the queue to the unmapped queue list 255. The scheduler 205 then moves the queue to the unmapped queue list in response to verifying that the queue is empty, e.g., the read pointer and write pointer indicate the same location in the queue, which avoids race conditions that occur if a command buffer is written to a queue while the scheduler 205 is in the process of unmapping the queue.

Figure 3:
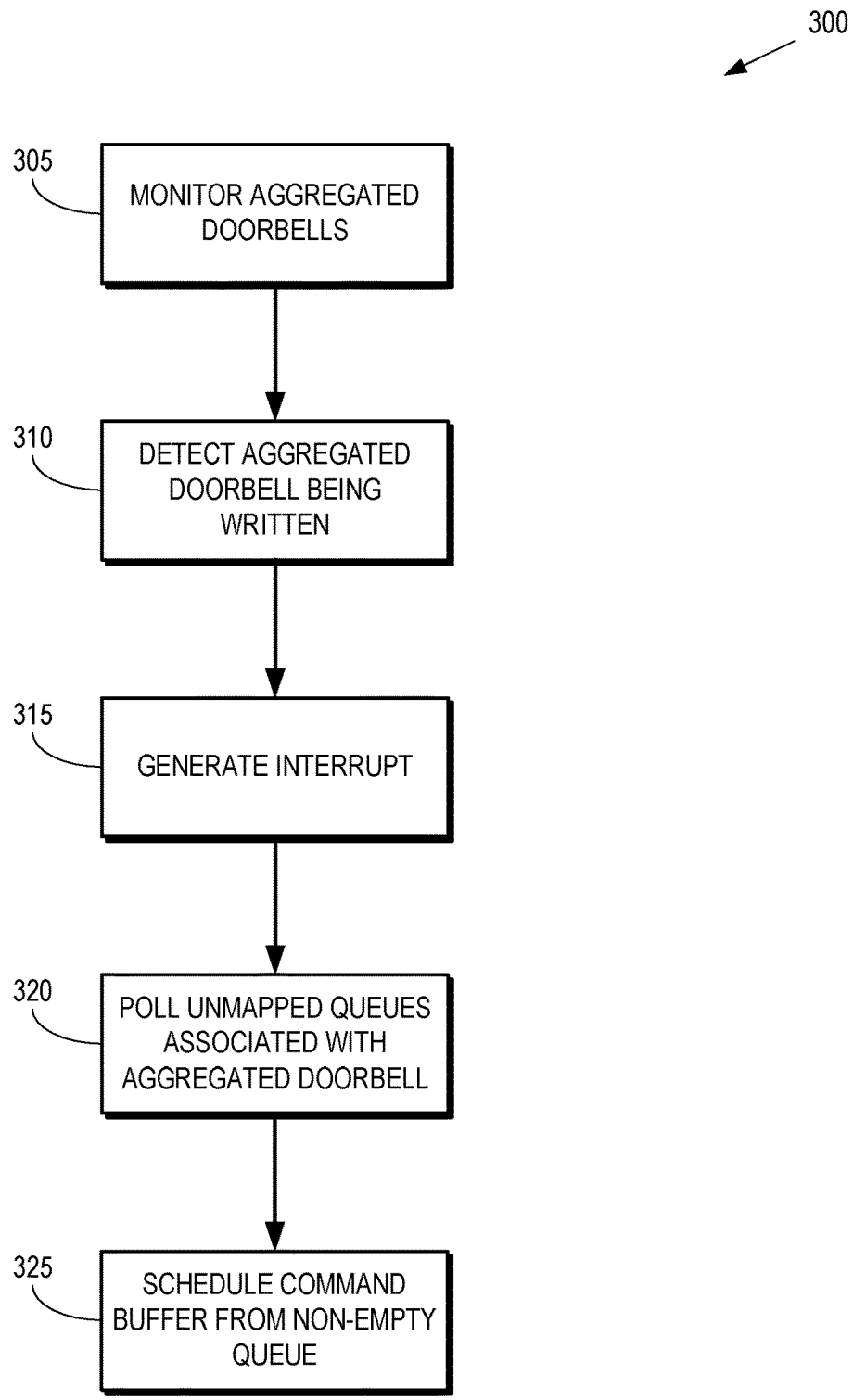
FIG. 3 is a flow diagram of a method of monitoring aggregated doorbells associated with unmapped queues according to some embodiments.

FIG. 3 is a flow diagram of a method 300 of monitoring aggregated doorbells associated with unmapped queues according to some embodiments. The method 300 is implemented in some embodiments of the processing system 100 shown in FIG. 1 and the scheduling system 200 shown in FIG. 2.

At block 305, a hardware doorbell monitor monitors one or more aggregated doorbells that are mapped to subsets of empty queues in a one-to-many relationship. At block 310, the hardware doorbell monitor detects that one of the aggregated doorbells has been written to indicate that a queue in the subset of empty queues associated with the aggregated doorbell has received a command buffer and is no longer empty. At block 315, the hardware doorbell monitor generates an interrupt in response to detecting that the aggregated doorbell has been written.

At block 320, a scheduler detects the interrupt and, in response, polls the unmapped queues associated with the aggregated doorbell that was written. For example, if several unmapped queues are associated with the aggregated doorbell, the scheduler polls each of the several unmapped queues to determine which of the unmapped queues received the command buffer. Polling the unmapped queues includes clearing the aggregate doorbell, making a pass through the unmapped queues to identify the unmapped queue that receives the command buffer, popping the command buffer from the unmapped queue, and then making another pass through the unmapped queues to detect any unmapped queues that have been written since the aggregate doorbell was cleared. If an unmapped queue has been written, the aggregate doorbell is written and the method 300 is repeated for the newly written aggregate doorbell. At block 325, the scheduler schedules the command buffer from the non-empty queue or adds the command buffer to a pool of command buffers that are available for scheduling.

Figure 4:
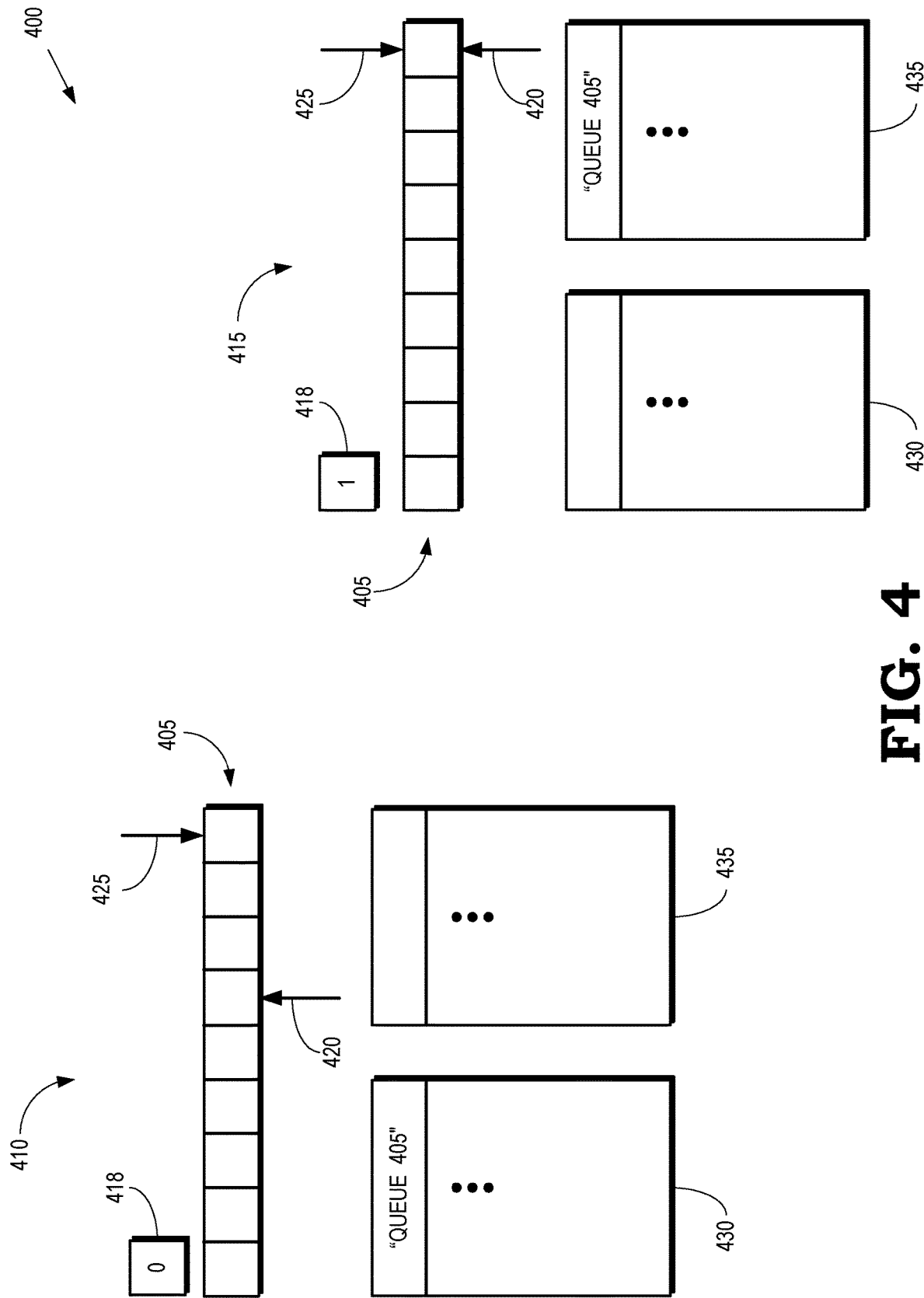
FIG. 4 is a block diagram of a process of moving a queue from a list of unmapped queues to a list of unmapped queues according to some embodiments.

FIG. 4 is a block diagram of a process 400 of moving a queue 405 from a list of unmapped queues to a list of unmapped queues according to some embodiments. The process 400 is implemented in some embodiments of the processing system 100 shown in FIG. 1 and the scheduling system 200 shown in FIG. 2. In the illustrated embodiment, the process 400 shows a first state 410 prior to moving the queue 405 and a second state 415 after moving the queue 405. An index 418 stores a value that indicates whether the queue 405 is in the first state 410 or the second state 415.

In the first state 410, a write pointer 420 indicates a different entry in the queue 405 than a read pointer 425. The different locations in the queue 405 indicated by the write pointer 420 and the read pointer 425 indicate that the queue 405 includes one or more command buffers that are ready to be scheduled for execution. The queue 405 is therefore a non-empty queue in the first state 410. The queue 405 is mapped to a doorbell such as one of the doorbells 225-228 in the first subset 235 shown in FIG. 2. An entry identifying the queue 405 is included in a mapped queue list 430. An unmapped queue list 435 does not include an entry identifying the queue 405 in the first state 410. The index 418 has a value of "0" to indicate that the queue 405 is mapped to a doorbell and included in the mapped queue list 430.

In the second state 415, the write pointer 420 indicates the same entry in the queue 405 as the read pointer 425, which indicates that the queue 405 is empty in the second state 415. In response to becoming empty, the queue 405 is unmapped from a doorbell such as one of the doorbells 225-228 in the first subset 235 shown in FIG. 2. The queue 405 is therefore moved from the mapped queue list 430 to the unmapped queue list 435. An entry identifying the queue 405 is included in the unmapped queue list 435. The index 418 has a value of "1" to indicate that the queue 405 is not mapped to a doorbell and is not in the mapped queue list 430. Instead, the queue 405 is associated with an aggregated doorbell and included in the unmapped queue list 435.

Figure 5:
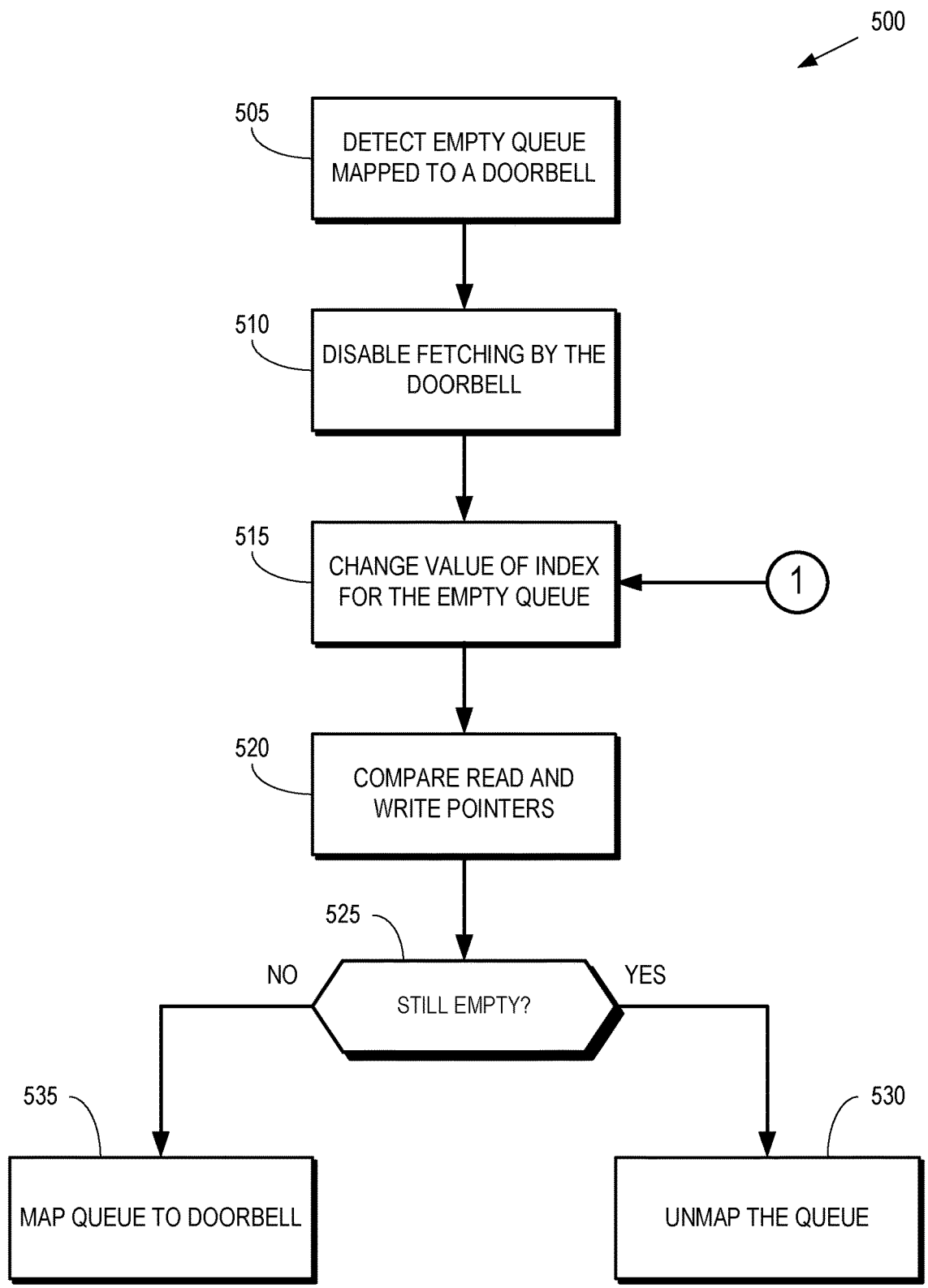
FIG. 5 is a flow diagram of a method of unmapping empty queues from doorbells according to some embodiments.

FIG. 5 is a flow diagram of a method 500 of unmapping empty queues from doorbells according to some embodiments. The method 500 is implemented in some embodiments of the processing system 100 shown in FIG. 1 and the scheduling system 200 shown in FIG. 2.

At block 505, a scheduler detects an empty queue that is mapped to a doorbell on a one-to-one basis. At block 510, the scheduler disables fetching by the doorbell so that the scheduler does not attempt to schedule command buffers from the empty queue associated with the doorbell. At block 515, the scheduler modifies a value of an index (such as the index 418 shown in FIG. 4) that indicates whether the queue is included in a mapped queue list or an unmapped queue list. For example, the scheduler can change the value of the index from "0" to "1" to indicate that the queue is to be removed from the mapped queue list and added to the unmapped queue list so that the queue is associated with the aggregate doorbell. In response to modifying the value of the index, the scheduler compares (at block 520) a read pointer to a write pointer of the queue to determine whether it is still empty. As discussed herein, empty queues are detected by comparing locations indicated by read and write pointers associated with the queues.

At decision block 525, the scheduler determines whether the queue is still empty after modification of the index, e.g., by comparing locations indicated by the read and write pointers associated with the queue. If the read pointer is equal to the write pointer, which indicates that the queue is still empty, the method 500 flows to block 530 and the scheduler completes the unmapping process. If scheduler determines the queue is empty and the scheduler wants to be informed when work is available in the queue, the scheduler transmits a request to a kernel mode driver (such as the kernel mode driver 128 shown in FIG. 1) on the CPU to request that the queue be suspended and that the doorbell for the suspended queue be switched to an aggregated mode for the privileged mode. If the read pointer is different than the write pointer, which indicates that the queue has been written in the time interval since the empty queue was initially detected, the method 500 flows to block 535 and the non-empty queue is mapped to a doorbell, as discussed herein.

Figure 6:
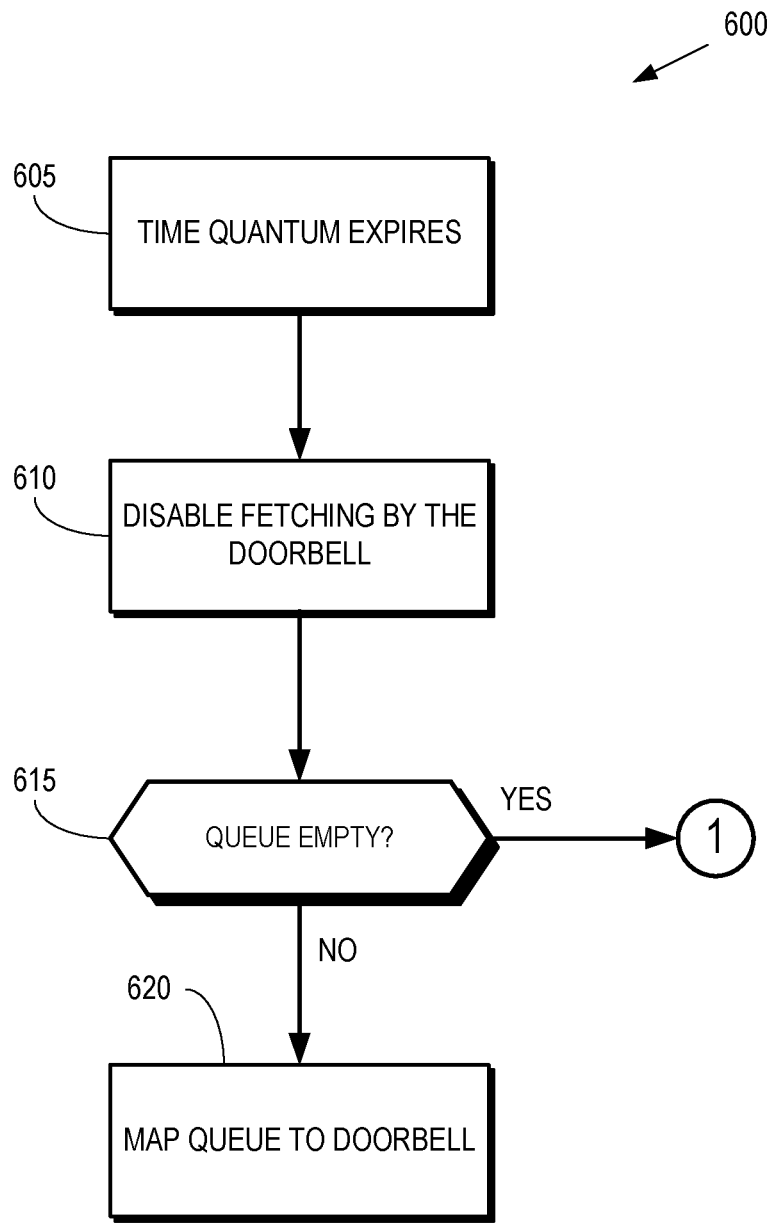
FIG. 6 is a flow diagram of a method of managing queues in response to expiration of a time quantum allocated to a process according to some embodiments.

FIG. 6 is a flow diagram of a method 600 of managing queues in response to expiration of a time quantum allocated to a process according to some embodiments. The method 600 is implemented in some embodiments of the processing system 100 shown in FIG. 1 and the scheduling system 200 shown in FIG. 2. Initially, the queue is associated with a doorbell that indicates that the queue currently or previously included one or more command buffers. The queue is initially associated with a process that has been allocated a time quantum for access to the queue.

At block 605, the time quantum allocated to the process associated with the queue expires. At block 610, the scheduler disables fetching by the doorbell so that the scheduler does not attempt to schedule command buffers from the queue. At decision block 615, the scheduler determines whether the queue is empty, e.g., by comparing read and write pointers that indicate the head and tail of the queue, respectively. The queue is empty if the read and write pointers are the same or indicate the same location in the queue. In that case, the method 600 flows to node 1, which corresponds to node 1 in FIG. 5. The method 600 therefore joins the method 500 at block 515. The queue is not empty if the read and write pointers are different or indicate different locations in the queue. In that case, the method 600 flows to block 620 and the non-empty queue is mapped to a doorbell.

In some embodiments, the apparatus and techniques described above are implemented in a system including one or more integrated circuit (IC) devices (also referred to as integrated circuit packages or microchips), such as the scheduling system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a plurality of queues configured to store commands prior to execution in a corresponding plurality of pipelines;
at least one first doorbell that is configured to map to at least one first queue of the plurality of queues on a one-to-one basis;
a second doorbell that is configured to map to a subset of the plurality of queues on a one-to-many basis;
a doorbell monitor that generates an interrupt in response to an empty queue in the subset of the plurality of queues becoming a non-empty queue; and
a scheduler configured to poll the subset of the plurality of queues in response to the interrupt and schedule a command from the non-empty queue for execution or add the command to a pool for subsequent execution.

2. The apparatus of claim 1, wherein the at least one first doorbell is written in response to a command being added to the at least one of the plurality of queues that is mapped to the at least one first doorbell, and wherein the second doorbell is written in response to a command being added to one of the queues in the subset of the plurality of queues.

3. The apparatus of claim 1, wherein the subset of the plurality of queues comprises more than one of the plurality of queues, and wherein the scheduler is configured to poll each queue in the subset of the plurality of queues to determine which queue in the subset of the plurality of queues became the non-empty queue.

4. The apparatus of claim 1, further comprising:
a storage component configured to store a first list indicating that the at least one first queue is mapped to the at least one first doorbell on a one-to-one basis and a second list indicating the subset of the plurality of queues that are mapped to the second doorbell on a one-to-many basis.

5. The apparatus of claim 4, wherein the scheduler is configured to move the at least one first queue from the first list to the second list in response to the at least one first queue becoming empty.

6. The apparatus of claim 5, wherein the scheduler is configured to disable fetching by the at least one first doorbell and initiate unmapping of the at least one first queue in response to the at least one first queue becoming empty or a time quantum expiring.

7. The apparatus of claim 6, wherein the scheduler is configured to modify an index that indicates whether the first queue is mapped or unmapped, and wherein the scheduler is configured to move the at least one first queue from the first list to the second list in response to verifying that the at least one first queue has been unmapped.

8. The apparatus of claim 7, wherein the scheduler is configured to associate the at least one first queue with the second doorbell in response to a write pointer for the at least one first queue being equal to a read pointer for the at least one first queue after the index is modified.

9. The apparatus of claim 1, further comprising:
a plurality of aggregated doorbells comprising the second doorbell, and wherein each of the plurality of aggregated doorbells is associated with different priorities, different properties, or different characteristics of a plurality of subsets of empty queues.

10. A method, comprising:
receiving a command at a first queue of a set of queues configured to store commands prior to execution in a corresponding plurality of pipelines, wherein the queues in the set are empty prior to receiving the command, and wherein the queues are mapped to a first doorbell;
generating an interrupt in response to the first doorbell being written to indicate that the first queue receives the command;
polling the set of queues in response to the interrupt to identify the first queue; and
scheduling the command from the first queue for execution or adding the command to a pool for subsequent execution.

11. The method of claim 10, further comprising:
writing the first doorbell in response to a command being added to any one of the queues in the set.

12. The method of claim 10, further comprising:
storing a first list indicating the set of queues that are mapped to the first doorbell and a second list indicating at least one second queue that is mapped to at least one second doorbell on a one-to-one basis.

13. The method of claim 12, further comprising:
moving the at least one second queue from the second list to the first list in response to the at least one second queue becoming empty.

14. The method of claim 13, further comprising:
disabling fetching by the at least one second doorbell; and
initiating unmapping of the at least one second queue in response to the at least one second queue becoming empty.

15. The method of claim 14, further comprising:
initiating unmapping of the first queue by modifying an index that indicates whether the first queue is mapped or unmapped or suspending the first queue; and
moving the at least one second queue from the second list to the first list in response to verifying that the at least one second queue has been unmapped.

16. The method of claim 15, further comprising:
associating the at least one second queue with the first doorbell in response to a write pointer for the at least one second queue being equal to a read pointer for the at least one second queue after modifying the index.

17. A method, comprising:
writing a first doorbell in response to receiving a command at one of a set of empty queues configured to store commands prior to execution in a corresponding plurality of pipelines;
generating an interrupt in response to the first doorbell being written;
polling the set of empty queues in response to the interrupt to identify a first queue that receives the command; and
scheduling the command from the first queue for execution or adding the command to a pool for subsequent execution.

18. The method of claim 17, further comprising:
storing a first list indicating the set of empty queues that are mapped to the first doorbell and a second list indicating at least one second queue that is mapped to at least one second doorbell on a one-to-one basis.

19. The method of claim 18, further comprising:
moving the at least one second queue from the second list to the first list in response to the at least one second queue becoming empty.

20. The method of claim 19, further comprising:
associating the at least one second queue with the first doorbell in response to a write pointer for the at least one second queue being equal to a read pointer for the at least one second queue.

* * * * *